United States Patent [19]

Monerie et al.

[11] Patent Number: 4,506,388

[45] Date of Patent: Mar. 19, 1985

[54] PROCESS AND APPARATUS FOR THE COHERENT DETECTION AND DEMODULATION OF A PHASE-MODULATED CARRIER WAVE IN A RANDOM POLARIZATION STATE

[76] Inventors: Michel Monerie, Bourg de Ploulech; Alain Leclert, Kerléo Ploulec'h, both of 22300 Lannion, France

[21] Appl. No.: 443,143

[22] Filed: Nov. 19, 1982

[30] Foreign Application Priority Data

Nov. 26, 1981 [FR] France .................. 81 22164

[51] Int. Cl.³ .............................................. H04B 9/00
[52] U.S. Cl. ...................... 455/616; 455/619
[58] Field of Search .......... 455/615, 616, 619, 60; 329/144; 343/361, 362, 363, 364, 365, 366

[56] References Cited

U.S. PATENT DOCUMENTS

| 4,044,247 | 8/1977 | Brown, Jr. | 455/619 |
| 4,063,084 | 12/1977 | Goodwin et al. | 455/619 |

*Primary Examiner*—Joseph A. Orsino, Jr.
*Attorney, Agent, or Firm*—Kerkam, Stowell, Kondracki & Clarke

[57] ABSTRACT

Process for the coherent detection and demodulation of a carrier wave in a variable polarization state and apparatus for performing this process.

According to the invention, the incident wave is subdivided into two components having orthogonal polarization states and these two components form the object of a coherent detection. For this purpose, a local oscillator supplies a local wave, which is itself divided into two components having orthogonal polarization states, which supply two detection - demodulation channels. The demodulation signals of these two channels are combined, and in particular added, and the resulting signal makes it possible to recover the information independently of the polarization state of the incident wave.

Application to optical transmission.

3 Claims, 1 Drawing Figure

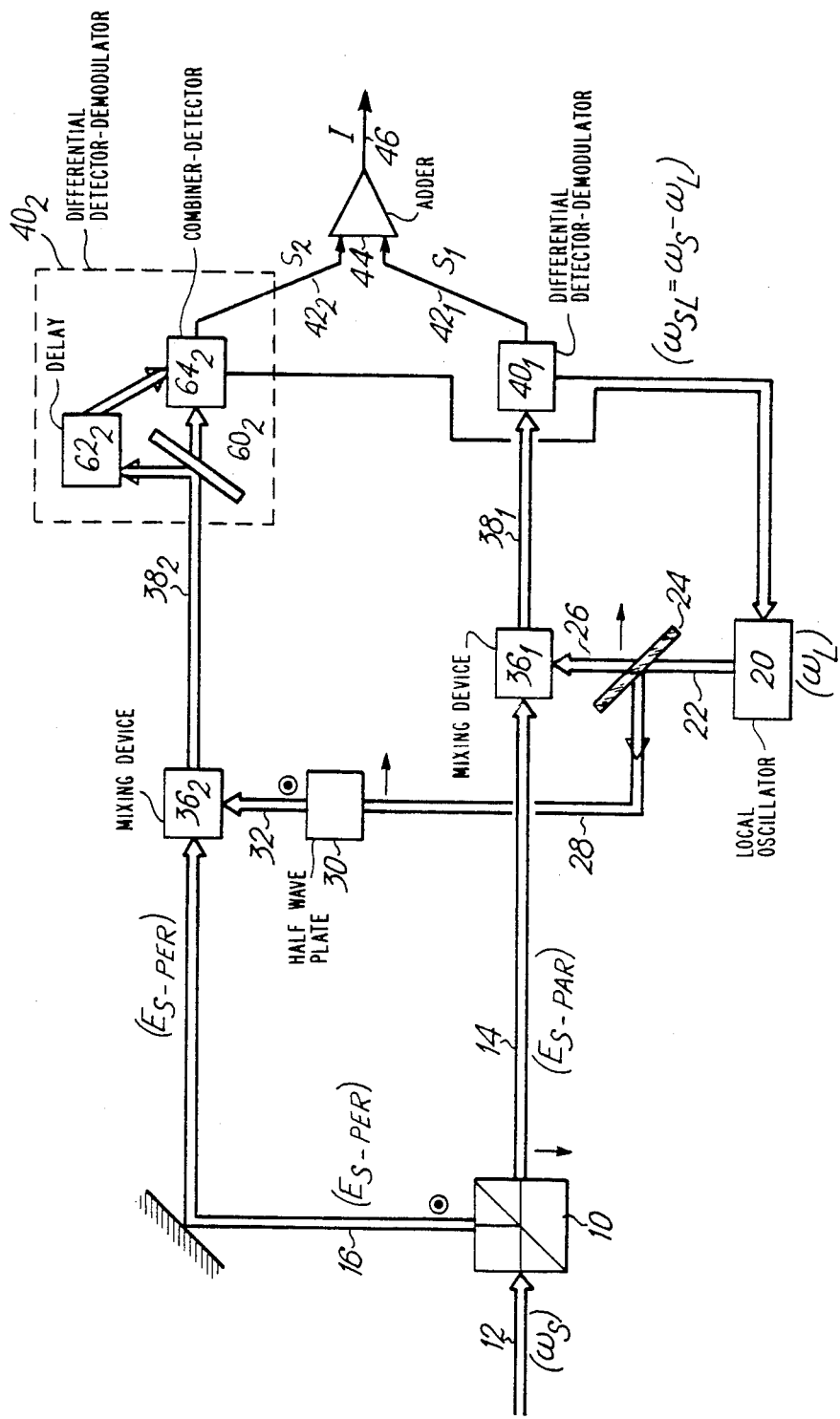

PROCESS AND APPARATUS FOR THE COHERENT DETECTION AND DEMODULATION OF A PHASE-MODULATED CARRIER WAVE IN A RANDOM POLARIZATION STATE

BACKGROUND OF THE INVENTION

The present invention relates to a process for the coherent detection and demodulation of a phasemodulated carrier wave in a random polarization state and to an apparatus for performing this process. It is used in the optical transmission of data, particularly by optical fibres.

An optical transmission system generally comprises a transmitter, in which an optical wave is modulated by a signal containing the data to be transmitted, a transmission line (generally a single-mode optical fibre) and a receiver in which the transmitted wave is demodulated. The detection operation can be of the coherent type in the sense that it uses a coherent optical wave which is struck with the modulated carrier wave and produced by an appropriately controlled local oscillator.

This so-called coherent detection procedure is described in numerous articles and reference is made, for example, to the article by F. FAVRE et al entitled "Progress Towards Heterodyne-Type Single-Mode Fibre Communication Systems", published in the Journal of Quantum Electronics, Vol. QE-17, No. 6, June 1981, pp. 897 to 905.

Coherent detection requires a stable polarization state of the wave to be demodulated. However, this is not generally the case, due to disturbances suffered by the wave during its propagation in the fibre. It is then necessary to provide means for correcting this instability. A first solution which has been proposed consists of using a linear or circular polarization maintaining fibre, as described in the article by L. JEUNHOMME et al entitled "Polarisation-maintaining single-mode fibre cable design" published in Electronics Letters, Nov. 20th 1980, Vol. 16, No. 24, pp. 921/2. Another known solution consists of the stabilization of the polarization by feedback, as described in the article by ROD. C. ALFERNESS entitled "Electrooptic Guided-Wave Device for General Polarization Transformations", published in the IEEE Journal of Quantum Electronics, Vol. QE-17, No. 6, June 1981, pp. 965/9 and in the article by R. ULRICH entitled "Polarization stabilization on single-mode fiber" published in Applied Physics LEtters, 35 (11), Dec. 1st 1979, pp. 840/2.

However, both these solution types suffer from disadvantages, such as additional losses due to the special structure of the polarization maintaining fibre and possibly ageing problems, or large insertion losses in the case of active polarization control. In both these solutions, the increase of the losses is at least 10 dB, even in the optimum case.

Moreover, the polarization maintaining fibre solution causes problems with regards to connections between fibres and as described in the article by M. MONNERIE entitled "Polarization-maintaining single-mode fiber cables: influence of joins" published in Applied Optics, Vol. 20. No. 14, July 15th 1981.

BRIEF SUMMARY OF THE INVENTION

The problem of the present invention is to obviate these disadvantages by overcoming the necessity of having a stable and clearly defined polarization state of the wave to be demodulated. It is then possible to use conventional single-mode fibres, particularly those giving the minimum attenuation at the operating wavelength and there is no need for an active polarization control, which is disadvantageous to the connection balance. The realisation of the invention thus makes it possible to obtain a coherent detection system, with a connection balance greater than that obtained with the known apparatus.

The problem of the stability of the polarization state of the wave to be detected does not occur when transmitting takes place in free space (e.g. with the aid of radiation of 10.6 $\mu$m), because the transmission medium is then only very slightly or non-depolarizing. Thus, the invention is of particular interest in the transmission by optical fibres, but naturally transmissions in free space with waves other than optical waves are not as such excluded from the scope of the invention.

The essential idea of the invention is to transfer to electronic demodulation circuits, the operations making it possible to take account of polarization variations of the incident wave. This transposition is possible in view of the fact that the characteristic bands of the disturbances (thermal and vibrational) are well below 1 MHz and consequently well below the frequency of the data.

More specifically, the invention relates to a process for the coherent detection and demodulation of a phase-modulated carrier wave in a random polarization state, comprising mixing the wave to be detected with an auxiliary wave transmitted by a controlled local oscillator and detecting in the wave resulting from the mixing operation, the data contained therein, wherein the wave to be demodulated is separated into two components having orthogonal polarization states, the wave transmitted by the local oscillator is divided into two local partial waves having orthogonal polarization states, respectively identical to the polarization states of the two components of the wave to be demodulated each component of the wave to be demodulated is mixed with the local partial wave having the same polarization state, differential detection-demodulation is carried out on each wave resulting from the mixing operation, which supplies electrical detection-demodulation signals and the electrical detection-demodulation signals are added, which restores the data independently of the polarization state of the modulated carrier wave.

The term orthogonal polarization states is understood to mean random states (linear polarizations of orthogonal directions, or right-handed and left-handed circular polarizations, etc), the idea of orthogonality being taken in a very general sense, where the overlap integral of two functions is Zero.

The invention also relates to an apparatus for performing the process described hereinbefore, which comprises means suitable for performing these operations.

DESCRIPTION OF THE DRAWING AND PREFERRED EMBODIMENT

The invention is described in greater detail hereinafter relative to a non-limitative embodiment and the attached drawing showing an apparatus according to the invention operating in differential demodulation with a carrier wave modulated in two phase states.

As shown in the drawing, the apparatus according to the invention comprises:

a separator 10 receiving the incident wave 12 to be demodulated, said wave being phase-modulated and having a angular frequency $\omega_S$, whilst its polarization is in a random state, the separator supplying two linear polarization waves 14, 16, which are rectangular with respect to one another, the polarization of wave 14 being in the plane of the drawing (indicated by an arrow), whilst that of wave 16 is perpendicular to said plane (indicated by a dotted circle), said waves being designated hereinafter $E_{S-par}$ and $E_{s-per}$, the separator 10 being e.g. a birefringent prism;

a local oscillator 20 supplying a local wave 22 of pulsation $\omega_L$ which, in the illustrated example, is polarized in a linear manner in the plane of the drawing;

a semi-transparent plate 24 located in the path of wave 22 and giving rise to two partial local waves 26, 28;

a half-wave plate 30 receiving the partial local wave 28, whose polarization is in the plane of the drawing and which transforms it into a wave 32, whose polarization is perpendicular to said plane, i.e. parallel to that of wave 16;

two channels comprising in each case a mixing device $36_1/36_2$ receiving one of the components of the wave to be demodulated 14/16 and the partial local wave having the same polarization 26/32 and supplying a mixed wave $38_1/38_2$ as well as a differential detector-demodulator $40_1/40_2$ receiving an one input the mixed wave $38_1/38_2$ and supplying at an output an electrical signal $S_1/S_2$ carried by connection $42_1/42_2$, said detectors also controlling the local oscillator 20 by supplying an electrical signal with the angular frequency difference $2\omega_{SL} = 2(\omega_S - \omega_L)$, as will be seen hereinafter and which forms the error signal for oscillator 12;

an adder 44 with two inputs connected respectively to the two connections $42_1/42_2$ and which supplies, at an output 46, data (I) independent of the polarization state of the incident wave.

The apparatus functions in the following manner.

In differential demodulation, detectors $40_1/40_2$ mix the incident wave with a wave delayed by one period or cycle and instead of detecting the phase $\alpha$, detect the phase jump $\Delta\alpha$ between one period and the next.

As shown for differential detector-demodulator $40_2$ only, each of the detector-demodulators may split the beam as by splitter $60_2$. One of the beams from splitter $60_2$ is delayed by delay $62_2$ and fed to combiner-detector $64_2$ which generates an electrical detection-demodulation signal $42_2$.

The two components of the wave to be demodulated are in the form:

$$E_{S-per} = s \cos \psi . \exp i(w_s t + \phi_s + \alpha)$$

$$E_{S-per} = s \sin \psi e^{i\phi} . \exp i(w_s t + \phi_s + \alpha)$$

expressions in which:

$\psi$ is an angle dependent on the orientation of the polarization of the incident wave ($\psi = 0$ if this direction is perpendicular to the plane of the drawing), s is the amplitude of the incident wave, $\phi_s$ is an angle representing a phase noise from the source used in the transmitter and from the propagation, $\alpha$ is the data transmitted, which is equal to zero or $\pi$ in the case of two-state phase modulation, i is the symbol of the imaginaries, t is the time.

Each partial local wave has for the expression:

$$1 \exp i(\omega_L t + \phi_L)$$

in which 1 is an amplitude and $\phi_L$ a phase representing the phase noise of the local oscillator.

Each local wave is mixed with $E_{S-per}$ or $E_{S-par}$. After differential detection, i.e. combination of the incident mixed wave with the mixed wave delayed by a period T, we obtain a signal of form:

$$s^2 1^2 u^2 v^2 \cos \psi(t) . \cos \psi(t+T) \cos [\omega_{SL} t + \phi_{SL}(t) + \alpha(t)] . \cos [\omega_{SL}(t+T) + \phi_{SL}(t+T) + \alpha(t+T)]$$

in which $$\omega_{SL} = \omega_S - \omega_L$$

$$\phi_{SL} = \phi_S - \phi_L$$

u being the reflection coefficient of the mixer $36_1$ and v the transmission coefficient of said mixer.

On assuming that the various noises are negligible compared with the principle wave, the above signal can be written:

$$s^2 1^2 u^2 v^2 \cos^2 \psi . [\cos(\omega_{SL} T + \Delta\alpha) + \cos[\omega_{SL}(2t+T) + 2^\alpha SL + \Delta\alpha)]$$

by designating as $\Delta\alpha$ the variation of $\alpha$ between successive periods. By filtering, it is firstly possible to obtain a component with $2\omega_{SL}$, which is used for recovering the intermediate frequency, making it possible to control local oscillator 20. On then taking $\omega_{SL} T = 2k\pi$, in accordance with the differential demodulation principle, a continuous component is obtained, which is supplied by circuit $40_2$ on connection $42_2$ and which is in form:

$$s^2 1^2 u^2 v^2 \cos^2 \psi \cos \Delta\alpha.$$

This signal contains the data transmitted by means of $\Delta\alpha$, but it is dependent on the orientation of the polarization of the incident wave by the term $\cos^2 \psi$.

On the other channel is obtained at the output of circuit $40_1$ and in the same way, a signal:

$$s^2 1^2 u^2 v^2 \sin^2 \psi \cos \Delta\alpha.$$

The addition of these two signals in circuit 44 gives a signal equal to:

$$s^2 1^2 u^2 v^2 \cos \Delta\alpha$$

which is no longer dependent on the polarization state of the incident wave, but which is in fact the indicated result.

In certain respects, the apparatus according to the invention may appear similar to so-called heterodyne balance apparatus, as described e.g. in U.S. Pat. No. 3,694,656, granted on Sept. 26th 1972 to H. B. HENNING. Such an apparatus works with a carrier wave (T') having a clearly defined polarization direction. This wave is broken down into two orthogonal components by two crossed polarizers, whose directions are at 45° of the polarization direction of wave T', so that two components equal to T'' are obtained. A local wave (S') with a polarization direction perpendicular to the operating wave is also broken down into two equal waves S'' by the two aforementioned polarizers. As the local wave S' is perpendicular to wave T', two identical waves are not obtained after the two polarizers and what is in fact obtained is respectively the sum $(S''+T'')/2$ and the difference $(S''-T'')/2$. Two photodetectors make it possible to supply the detected signals $(S'''+T''')^2/2$ and $(S'''-T''')^2/2$. A differential amplifier receives these two signals and only allows the double products to remain, i.e. in total $2S^{IV}T^{IV}$.

The differences between such a circuit and that according to the invention are based both on the principle and on the means used. In a heterodyne balance circuit, it is necessary for the polarization direction of the carrier wave to be strictly fixed. Thus, if this was not the case and if the polarization direction fluctuated, the two components supplied by the two polarizers would no longer be equal and the differential amplifier would no longer receive the sum and the difference of two identical signals, but instead the sum and the difference of two different signals. Its output would then supply a signal varying with the polarization of the input wave. In the case of the invention, it has been seen that the carrier wave can have a random polarization direction, because it is no longer involved in the signal which is finally supplied.

With regards to the means used, the heterodyne balance firstly requires a first pair of crossed polarizers to obtain a carrier wave (T') and a local wave (S') having orthogonal polarizations, said pair being useless in the present invention. Then, the photodetectors used in a heterodyne balance are not differential demodulators as in the invention. Finally, in the prior art apparatus, it is necessary to use a differential amplifier so as to retain only the double product of the components, whereas in the invention use is made of an adder for reasons indicated hereinbefore, in order to bring about the disappearance of term ($\psi$) representing the polarization direction.

What is claimed is:

1. A process for the coherent detection and demodulation of a phase-modulated carrier wave, said carrier wave having a random polarization state, a frequency and a phase and carrying information through said phase, comprising the steps of: generating a local wave having a frequency different from said frequency of said carrier wave, separating said carrier wave into two components having orthogonal polarization directions, dividing said local wave into two local partial waves having orthogonal polarization directions respectively identical to the polarization directions of the two components of the carrier wave, mixing each component of said carrier wave with the local partial wave having the same polarization direction to form two mixed waves, each mixed wave having a period, carrying out a differential detection-demodulation on each mixed wave by delaying each mixed wave by a period to form a corresponding delayed wave and combining each mixed wave with the corresponding delayed wave to obtain two electrical detection-demodulation signals, adding said two electrical detection-demodulation signals to generate an output dependent on said information carried by said carrier wave and independent of the polarization of the carrier wave.

2. An apparatus for the coherent detection and demodulation of a phase-modulated carrier wave, said carrier wave having a random polarization state, a frequency and a phase and carrying information through said phase, the apparatus comprising: a controlled local oscillator transmitting a local wave having a frequency different from said frequency of said carrier wave; a beam separator receiving said carrier wave and separating it into two components with orthogonal polarization directions; means receiving the local wave from the local oscillator and separating it into two local partial waves having orthogonal polarization directions respectively identical to the polarization directions of the two components supplied by the separator; a first mixer receiving one of said components from the carrier wave and the partial local wave having the same polarization direction, said first mixer supplying a first mixed wave having a period; a first detector-demodulator receiving said first mixed wave, delaying said first mixed wave by a period to form a first delayed wave and combining said first mixed wave with said first delayed wave, said first detector-demodulator supplying a first signal at an output; a second mixer receiving the other of said components of the carrier wave and the partial local wave having the same polarization direction, said second mixer supplying a second mixed wave having a period; a second detector-demodulator receiving said second mixed wave, delaying said second mixed wave by a period to form a second delayed wave and combining said second mixed wave with said second delayed wave, said second detector-demodulator supplying a second electrical signal at an output; and an adder having two inputs connected respectively to the outputs of the first and second detector-demodulator, said adder having an output delivering a signal dependent on the information carried by said carrier wave and independent of the polarization of the carrier wave.

3. The apparatus of claim 2 wherein said local oscillator is controlled by said first and second detector-demodulators.

* * * * *